United States Patent [19]

McCutchan, Jr.

[11] Patent Number: 4,468,210
[45] Date of Patent: Aug. 28, 1984

[54] COMPOSITE PLASTIC PULLEY

[75] Inventor: Ben O. McCutchan, Jr., Massillon, Ohio

[73] Assignee: Dyneer Corporation, Canton, Ohio

[21] Appl. No.: 273,237

[22] Filed: Jun. 12, 1981

[51] Int. Cl.³ .................... F16H 55/36; F16H 55/48
[52] U.S. Cl. ................................ 474/170; 474/902; 474/177; 474/178
[58] Field of Search ............... 474/161, 168, 170, 177, 474/178, 190, 902; 74/446, DIG. 10

[56] References Cited

U.S. PATENT DOCUMENTS

| | | | |
|---|---|---|---|
| 1,771,370 | 7/1930 | Benge | 74/446 |
| 2,017,149 | 10/1935 | Greening | 474/178 |
| 2,137,987 | 11/1938 | Smith | 474/177 |
| 2,198,831 | 4/1940 | Moyer | 474/177 |
| 2,577,547 | 12/1951 | Vasselin | 474/178 |
| 2,685,801 | 8/1954 | Tishman | 474/168 |
| 2,798,771 | 7/1957 | Douglas | 29/159.3 |
| 2,869,223 | 1/1959 | Killian et al. | 29/159 R |
| 3,557,423 | 1/1971 | Wolfe et al. | 74/446 X |
| 3,557,424 | 1/1971 | Heathwaite et al. | 29/159.2 |
| 3,651,705 | 3/1972 | Bertinetti et al. | 474/161 |
| 3,696,685 | 10/1972 | Lampredi | 474/161 |
| 3,772,928 | 11/1973 | Gobeille | 474/170 |
| 3,788,155 | 1/1974 | Cigala et al. | 474/177 |
| 3,908,421 | 9/1975 | Killian et al. | 72/82 |
| 3,962,926 | 6/1976 | Kotlar | 29/159 R |
| 3,977,264 | 8/1976 | Sproul | 474/170 |
| 3,991,598 | 11/1976 | Kraft | 72/83 |
| 3,994,181 | 11/1976 | Sproul | 474/170 |
| 3,995,474 | 12/1976 | Kraft | 72/83 |
| 4,059,023 | 11/1977 | Sproul | 474/170 |
| 4,098,137 | 7/1978 | Yaros | 474/170 |
| 4,231,265 | 11/1980 | Hanisch et al. | 474/152 |
| 4,336,609 | 1/1983 | Speer | 29/159 R |
| 4,364,736 | 12/1982 | Hetz | 474/168 |

FOREIGN PATENT DOCUMENTS 1100747 9/1955 France .
667737 6/1979 U.S.S.R. .................... 74/DIG. 10

Primary Examiner—Lawrence J. Staab
Assistant Examiner—Michael D. Bednarek
Attorney, Agent, or Firm—Frease & Bishop

[57] ABSTRACT

A composite pulley construction intended primarily for use with the endless drive belt for vehicle accessories. The pulley is formed of a sheet metal body and has a multi-V-groove belt-receiving formation molded of plastic on an outer cylindrical wall portion of the metal body. The plastic belt-receiving formation has a series of inverted V-shaped projections forming outwardly opening V-shaped grooves located between adjacent pairs of the V-shaped projections and between a pair of outer, spaced belt-retaining annular projections also formed of plastic. The belt-retaining projections extend radially outwardly beyond the crests of the V-shaped groove-forming projections a predetermined distance and reduce sideways movement of the belt with respect to the intervening V-grooves. The outer surface of the cylindrical wall portion preferably is knurled to enhance the bonding of the plastic to the metal surface.

1 Claim, 15 Drawing Figures

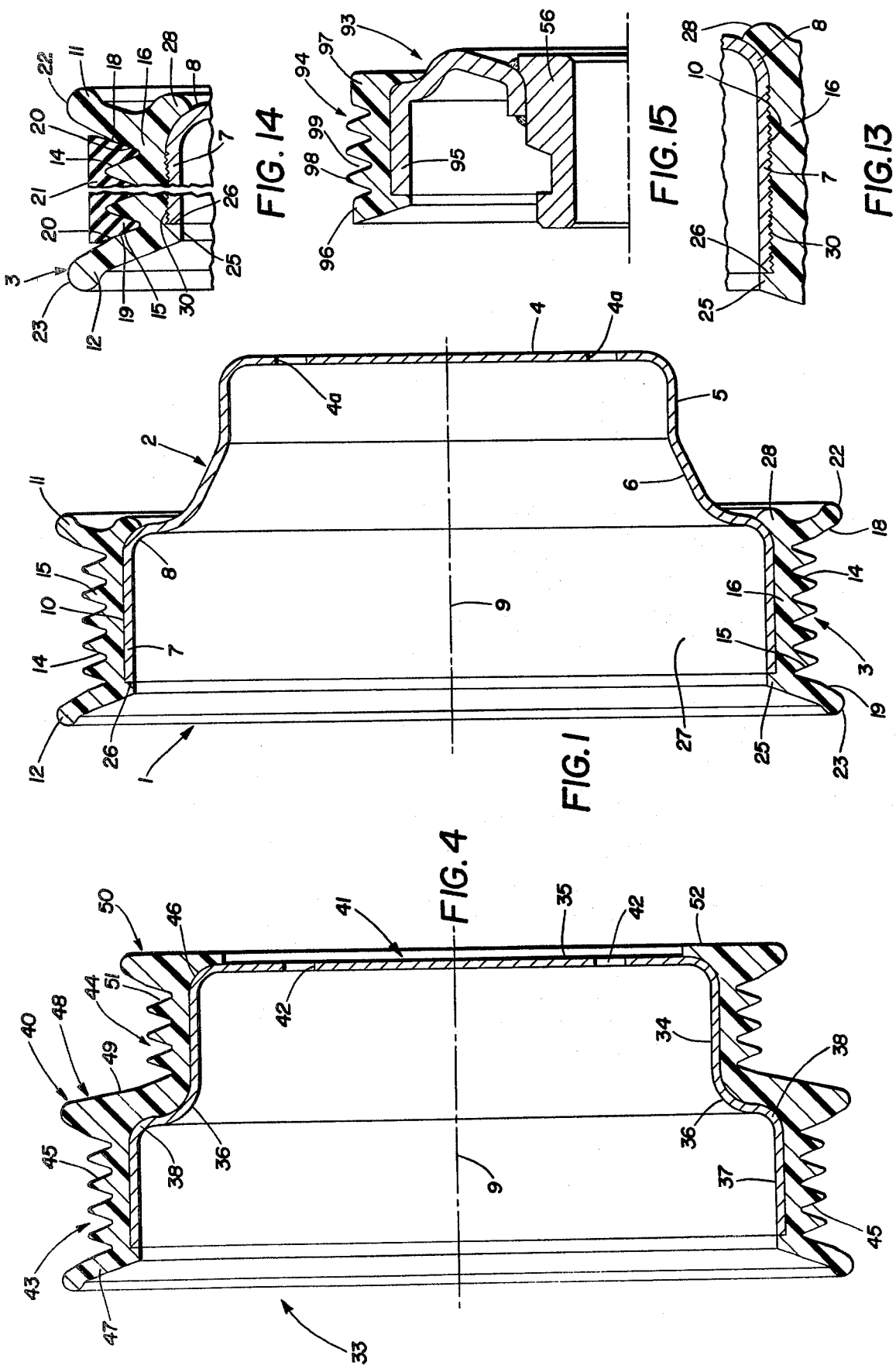

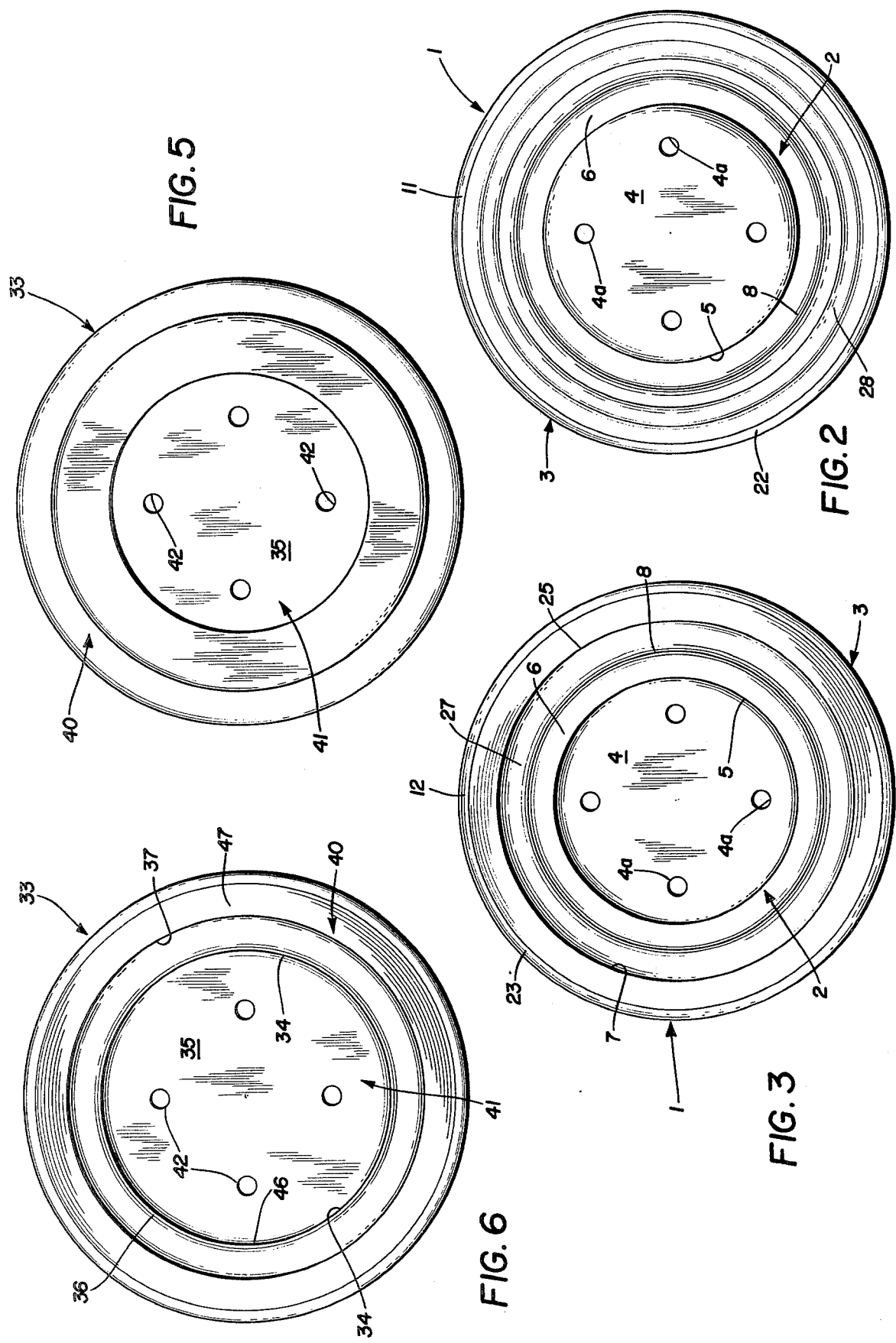

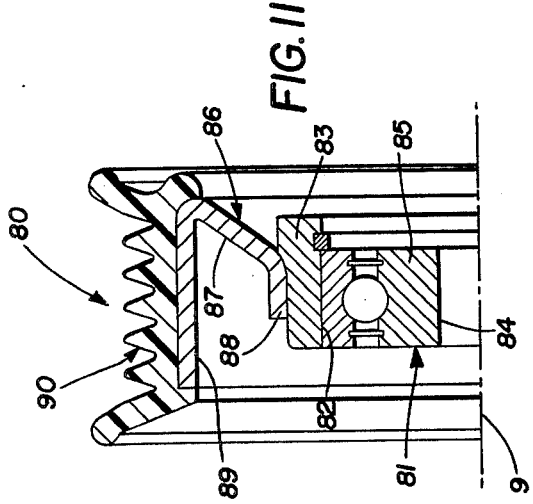
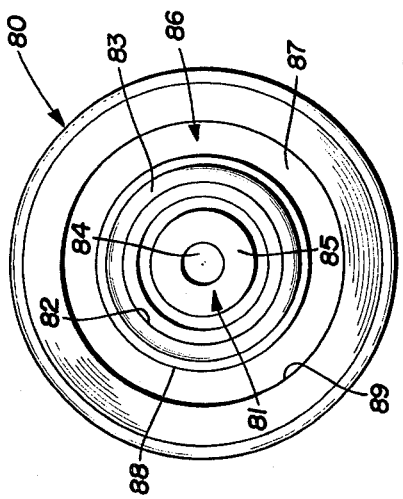
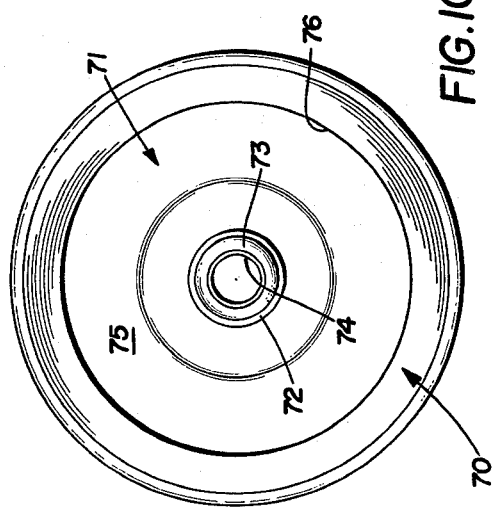
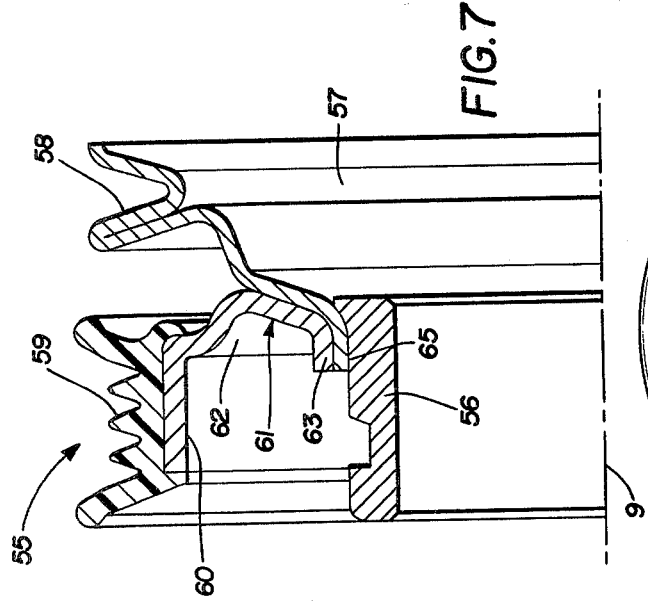
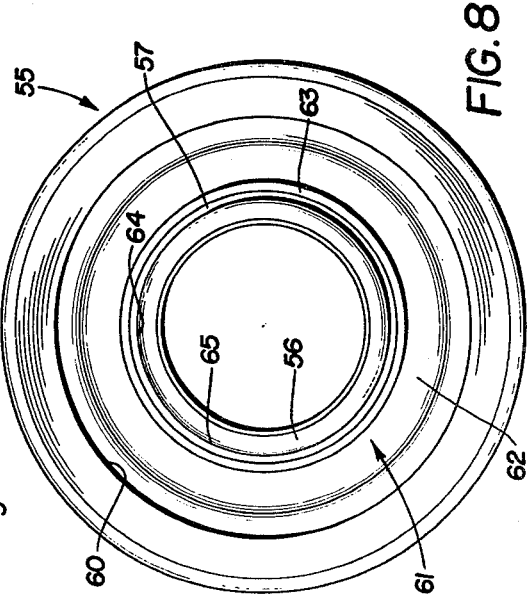

4,468,210

COMPOSITE PLASTIC PULLEY

BACKGROUND OF THE INVENTION

1. Field of the Invention

The invention relates to V-grooved pulleys for use with the endless drive belt of a vehicle accessories drive system. More particularly, the invention relates to a composite pulley in which the body of the pulley is formed of sheet metal and a unique multi-V-groove belt-receiving formation is molded of plastic on an outer cylindrical wall portion of the metal body.

2. Description of the Prior Art

There is a trend today in the automobile industry to operate the various vehicle accessories such as the power steering pump, air pumps, air conditioning and alternator by a single endless drive belt driven by a pulley connected to the engine crankshaft. This system is referred to as a "serpentine" drive belt system. This has resulted in the need for strong, efficient and reliable operating pulleys for driving the various vehicle accessories by their connection to the serpentine drive belt. These pulleys must have accurately formed V-grooves, dynamic pulley balance, and thick, rigid and strong areas in which the pulley grooves are formed.

Heretofore, such multi-V-grooved pulleys were formed completely of metal. A cup-shaped blank was either die stamped or roller spun from metal sheets with the V-grooves being subsequently stamped, slit or roller spun in an outer wall portion thereof. Examples of such all-metal pulleys are shown in U.S. Pat. Nos. 2,869,223, 3,908,421, 3,995,474 and 3,991,598.

These spun metal pulleys are formed with the usual single, double or triple V-shaped belt-receiving grooves in which the V-groove-forming walls are either equal in thickness or thinner than the thickness of the parent metal of the pulley wall in which the grooves are formed. Also, these prior art grooves have generally rounded crests and valleys between adjacent grooves and are adapted to receive a plurality of individual drive belts having the usual inverted trapezoidal cross-sectional configurations and not the particular cross-sectional configurations of the serpentine drive belts.

One known pulley which has been produced for use with these serpentine drive belts known in the art as a poly-V-pulley or poly-V-grooved pulley and which eliminates many of the problems and difficulties encountered with prior pulleys is shown in U.S. Pat. No. 3,977,264 entitled Method of Making Poly-V-pulleys and Product. This patent discusses the problems and difficulties that are involved in forming a satisfactory pulley construction having the required multi-V-groove belt-receiving formation in an outer portion thereof for the serpentine drive belts. Although pulleys formed by the metal-working procedure of U.S. Pat. No. 3,772,928 provide a satisfactory and efficient pulley, it is believed that a composite pulley formed of plastic and metal provides a construction which is less expensive, lighter in weight, and has strength comparable with the all-metal pulleys heretofore used.

Composite pulleys formed of plastic and metal are not new, per se. U.S. Pat. Nos. 3,557,424, 3,651,705 and 3,696,685 illustrate examples of composite plastic and metal pulleys of the type in which the outer pulley surface is formed with a series of teeth for use with a toothed belt drive. U.S. Pat. Nos. 3,772,928 and 3,788,155 are examples of two known composite plastic metal pulleys in which the pulley is formed with a V-groove in an outer portion thereof. The plastic formation in which the V-grooves of these two known pulleys are formed use internal and external metal reinforcement to strengthen the grooves and use a considerable amount of plastic material. Unbalanced pulleys could result with such prior composite constructions if the plastic reinforcing metal tabs or members are not completely uniform and symmetrical throughout the metal body. Also, formation of these tabs requires another manufacturing operation and additional equipment, thereby increasing the cost of the final pulley product. Furthermore, the V-grooves of these two pulleys are of the type having a cross-sectional configuration adapted for receiving individual drive belts having a usual inverted trapezoidal cross-sectional configuration as the heretofore all-metal belt-receiving pulleys.

Accordingly, the need has existed for a new multi-V-groove pulley having a metal, generally cup-shaped body with a unique multi-V-groove belt-receiving formation molded of plastic on an outer wall portion of the metal body which is free of plastic-reinforcing metal tabs, thereby avoiding the difficulties and undesirable characteristics present in prior all-metal multi-V-grooved pulleys and achieving results not obtainable with existing composite plastic metal pulleys.

SUMMARY OF THE INVENTION

Objectives of the invention include providing a new composite pulley construction having a metal cup-shaped body which can be die stamped or roller spun from sheet metal, in which a multi-V-groove pulley formation molded of plastic is supported on an outer cylindrical surface of the body, in which the formation is defined by a series of outwardly opening V-shaped grooves which preferably are located between a pair of enlarged, spaced belt-retaining, annular-shaped end projections, and in which the plastic supporting wall of the metal body is free of projections heretofore required to reinforce the plastic pulley grooves. Another object is to provide such a composite pulley which is less expensive than the heretofore all-metal and composite plastic metal pulleys, which has sufficient strength at the location of the belt-receiving grooves without internal metal reinforcing members within the V-groove-forming plastic, and which provides better belt life and better pulley groove tolerances than believed possible with prior all-metal pulley constructions. Another object is to provide such a composite pulley which is lighter in weight than all-metal pulleys without sacrificing the required strength and rigidity, in which the pulley groove formation can be molded on pulley cup bodies having various mounting hub means and arrangements thereby providing a number of different pulleys for various engine applications, in which the pulley forming plastic material is less susceptible to rust and corrosion than prior all-metal pulleys, and in which the plastic has a self-lubricating effect which provides a better running relationship between the belt and pulley grooves to increase belt life and force transfer efficiency. A still further object is to provide such a composite pulley which achieves the stated objectives effectively and efficiently, and which solves problems and satisfies needs existing in the multi-V-groove belt drive art.

These and other objects and advantages may be obtained by the new multi-V-groove composite pulley construction, the general nature of which may be stated as including hub means for mounting the pulley for rotation, said hub means being concentric about a central axis passing through the center of said hub means; an annular web of sheet metal operatively connected to the hub means and extending outwardly therefrom; an outer wall portion formed of sheet metal integral with the annular web and extending parallel with and concentric to the central axis, said outer wall portion having a generally cylindrical outer surface; and a multi-V-groove pulley formation formed of molded plastic supported on the outer surface of the outer wall portion, said formation being defined by a series of outwardly opening V-shaped grooves located between a pair of spaced belt-retaining annular flanges.

BRIEF DESCRIPTION OF THE DRAWINGS

Preferred embodiments of the composite pulley construction of the invention—illustrative of the best modes in which applicant has contemplated applying the principles—are set forth in the following description and shown in the drawings, and are particularly and distinctly pointed out and set forth in the appended claims.

FIG. 1 is a cross-sectional view of one form of the improved composite plastic pulley construction;

FIG. 2 is a reduced right-hand end elevational view of the complete pulley of FIG. 1;

FIG. 3 is a reduced left-hand end elevational view of the complete pulley of FIG. 1;

FIG. 4 is a sectional view similar to FIG. 1 of a second embodiment of the improved composite pulley construction;

FIG. 5 is a reduced right-hand end elevational view of the complete pulley of FIG. 4;

FIG. 6 is a reduced left-hand end elevational view of the complete pulley of FIG. 4;

FIG. 7 is a sectional view of one-half of a third embodiment of the improved composite pulley construction;

FIG. 8 is a reduced left-hand end elevational view of the complete pulley of FIG. 7;

FIG. 9 is a sectional view similar to FIG. 7 of one-half of a fourth embodiment of the improved composite pulley construction;

FIG. 10 is a reduced left-hand end elevational view of the complete pulley of FIG. 9;

FIG. 11 is a sectional view similar to FIGS. 7 and 9 of one-half of a fifth embodiment of the improved composite pulley;

FIG. 12 is a reduced left-hand end elevational view of the complete pulley of FIG. 11;

FIG. 13 is an enlarged fragmentary sectional view showing the bonding of the plastic material of the multi-V-groove formation of one of the pulley embodiments with the knurled surface of the metal body;

FIG. 14 is an enlarged fragmentary sectional view showing the plastic V-groove formation mounted on the knurled surface of the metal body of one of the pulley embodiments; and FIG. 15 is a sectional view of one-half of a sixth embodiment of the improved composite pulley construction.

Similar numerals refer to similar parts throughout the drawings.

DESCRIPTION OF THE PREFERRED EMBODIMENTS

First Embodiment

One form of the improved composite pulley construction is indicated generally at 1, and is shown in FIGS. 1, 2 and 3. Pulley 1 includes as its main components a generally cup-shaped metal body 2 and a multi-V-groove formation formed of plastic, indicated generally at 3. Cup-shaped body 2 includes a hub portion formed by a disc-shaped planar hub wall 4 and an annular integrally connected cylindrical side wall 5. Hub wall 4 is formed with a plurality of holes 4a for rotatably mounting pulley 1 in conjunction with one of the vehicle accessories.

Hub side wall 5 is connected by an annular outwardly tapered wall 6 to an outermost annular wall 7 by an annular shouldered corner 8. Wall 7 extends generally parallel with and concentric to the central axis 9 of pulley 1. Cup-shaped metal body 2 may be formed by die stamping or roller spinning procedures which are well known in the art, and it may have various configurations other than that shown in FIG. 1 such as shown in the additonal embodiments discussed more fully below.

In accordance with the main feature of the invention, multi-V-groove pulley formation 3 is supported on and molded to the outer cylindrical surface 10 of wall 7. Wall 7 is free of projecting metal tabs or the like which extend into the groove-forming plastic material as in prior composite pulleys. Pulley groove formation 3 includes a pair of spaced inner and outer belt-retaining annular flanges or end projections 11 and 12, which are formed integrally with a series of intervening outwardly opening v-shaped grooves 14. V-grooves 14 are shown in the particular embodiment of FIG. 1. V-grooves 14 are formed by spaced pairs of inverted upwardly extending V-shaped projections 15 which are formed of plastic and project outwardly from a common integral base 16. The two endmost V-grooves 14 are formed by the endmost V-shaped projections 15 and the adjacent belt-retaining projections 11 and 12. The distance measured in an axial direction between the crests of adjacent V-shaped projections 15 preferably is equal to the depth measured in a radial distance of grooves 14.

Belt-retaining projections 11 and 12 are formed integrally with base 16 and of the same plastic material as are V-shaped projections 15. Retaining projections 11 and 12 extend radially outwardly beyond the crests of projections 15 in a slightly outwardly flared direction. Projections 11 and 12 project radially outwardly beyond the crests of V-shaped projections 15 a distance at least equal to or greater than the radial depth of V-grooves 14. This configuration provides for a sufficient length of projection sidewalls 18 and 19 for engagement with the sloped edges 20 of a serpentine drive belt 21, as shown in FIG. 14, preventing excess sideways movement of the belt with respect to multi-V-groove formation 3. The outer ends 22 and 23 of belt-retaining projections 11 and 12, respectively, are rounded, and in cross section have at least a semicircular configuration (FIG. 14). This configuration eliminates sharp edges which could possibly contact the moving drive belt damaging the same or injuring a mechanic or other individual performing maintenance on the vehicle engine.

Belt-retaining projection 12 terminates at an inner or lower end portion 25 which is molded over the outer edge 26 of cup-shaped metal body 2. Edge 26 of metal body 2 is circular and defines an open end 27 of pulley 1. The inner or lower end portion 28 of belt-retaining projection 11 has an outwardly projecting rounded configuration which extends partly along and over the annular shouldered corner 8 of metal body 2. Inner end portions 25 and 28 of belt-retaining projections 12 and 11, respectively, partially trap cylindrical wall 7 within the V-groove formation 3. This aids the attachment of formation 3 on metal body 2 preventing any axial movement of formation 3 with respect to body wall 7.

Referring to FIG. 13, outer surface 10 of cylindrical wall 7 may have a knurl 30 applied thereto to assist the bonding of the plastic of V-groove formation 3 on surface 10. The coefficient of expansion and contraction of the plastic and metal are different, whereby the contraction of the plastic material upon cooling will clamp and bond annular formation 3 tightly against cylindrical wall 7. However, knurl 30 will enhance this bonding action without requiring projecting metal tabs or the like.

The particular plastic from which multi-V-groove formation 3 is formed may vary depending upon the various physical characteristics desired in the final pulley product. Broadly, the plastic will be a high temperature, reinforced thermoplastic or thermosetting plastic. Two types of particular plastics which have been found suitable for use in molding formation 3 are: a phenolic plastic having a glass or mineral filler and sold by the Hooker Chemicals & Plastics Company of North Tonawanda, N.Y., under its trademark DUREZ, Grade No. 30645; and a phenolic plastic, glass fiber reinforced, manufactured by Rogers Corporation of Manchester, Conn., under its designation RX 862. Both of these types of plastics are high impact, heat resistant and asbestos free. Other types of plastics could be used in forming V-groove formation 3, although the above two types are believed to be quite satisfactory.

Second Embodiment

A second embodiment of the improved composite plastic pulley is indicated generally at 33, and is shown in FIGS. 4, 5 and 6. Pulley 33 is similar in most respects to pulley 1 except that hub side wall 34 of the metal cup-shaped body 41 extends in an axial direction from planar hub mounting wall 35 a greater distance than does hub side wall 5 of pulley 1. Metal body 41 of pulley 33 includes an annular outwardly extending tapered web wall 36 somewhat similar to wall 6 of pulley 1 which is joined with an outermost cylindrical wall 37 by an annular shouldered corner 38.

Planar hub wall 35 is formed with a plurality of mounting holes 42 and is integrally joined with hub side wall 34 by an annular shouldered corner 46.

In accordance with one of the main features of the invention, a stepped multi-V-groove formation indicated generally at 40, is molded of plastic and bonded to the cylindrical axially extending outer surfaces of cup-shaped body walls 34 and 37. Plastic formation 40 includes an outer V-groove formation portion 43 and a smaller diameter inner V-groove formation portion 4. Formation portion 43 is similar to the plastic V-groove formation 3 of pulley 1 except that formation 43 only has five V-shaped grooves 45 instead of the six V-shaped grooves 14 of plastic formation 3. Outer grooved portion 43 terminates in an outer belt-retaining end flange 47 similar to belt-retaining portion 12 of pulley 1 and in a second or intermediate belt-retaining flange 48.

Flange 48 has a somewhat different configuration than projection 11 or 12 of pulley 1. It is thicker and has an elongated sloped wall 49 which forms a belt-retaining member for one side of V-groove formation portion 44. A third annular belt-retaining projection, indicated at 50, is formed integrally of plastic with formation portion 44 and is spaced from the intervening projection 48. Another series of V-shaped grooves 51 is molded between projections 48 and 50. Projection 50 preferably terminates in a straight, radially extending end wall 52 which is molded over shouldered corner 46 to assist in securing formation 40 on walls 34 and 37. Intermediate projection 48 is molded about tapered wall 36 and shouldered corner 38.

Third Embodiment

A third embodiment of the improved composite plastic pulley is indicated generally at 55, and is shown in FIGS. 7 and 8. Only a half section of pulley 55 is shown in FIG. 7 with a complete end elevation being shown in FIG. 8. Pulley 55 includes a cylindrical hub 56 which mounts the pulley on a shaft, such as the shaft of a power steering pump or other vehicle accessory. An annular metal member 57 having a usual V-groove 58 formed in an outer portion thereof is attached by welding, brazing or the like on one end of hub 56 and projects outwardly therefrom. A usual trapezoidal-shaped drive belt is adapted to be located in groove 58 for driving additional accessories with the power being supplied thereto by a serpentine drive belt which is engaged in a multi-V-groove formation 59.

Formation 59 is molded of plastic on an outer, cylindrical, axially extending wall portion 60 of an annular metal body indicated generally at 61. Metal body 61 includes an annular web 62 which has a curved configuration and which terminates in an axially extending annular inner flange 63. Flange 63 forms a circular opening 64 for telescopically mounting body 61 on hub 56 and on a complementary-shaped annular flange 65 of metal member 57. Plastic V-groove formation 59 is similar to V-groove formation 3 and portions 43 and 44 of V-groove formation 40 and therefore is not described in further detail.

Fourth Embodiment

A fourth embodiment of the improved composite plastic pulley is indicated generally at 70, and is shown in FIGS. 9 and 10. FIG. 9 is a sectional view similar to pulley 55 in FIG. 7 of a half portion of pulley 70. FIG. 10 is an end elevation of the complete pulley of FIG. 9. Pulley 70 includes an annular, cup-shaped metal body 71 which has a central axially extending annular flange 72 for telescopically mounting pulley 70 on a cylindrical hub 73 for rotatably mounting pulley 70 on a shaft which is telescopically received within bore 74 of hub 73. Hub mounting flange 72 is connected by a bent annular web 75 formed of sheet metal material to an outermost axially extending cylindrical wall 76 by an annular shouldered corner 77.

Again, in accordance with the invention, a V-groove formation, indicated generally at 78, is molded of plastic on and partially about cylindrical wall 76. Formation 78 is similar to V-groove formations 3 and 59 and therefore is not described in further detail.

Fifth Embodiment

A fifth embodiment of the improved composite plastic pulley is indicated generally at 80, and is shown in FIGS. 11 and 12. Again, only one half of pulley 80 is shown in section in FIG. 11 with the complete pulley being shown in an end elevational view of FIG. 12. Pulley 80 is an idler pulley having a bearing assembly 81 telescopically mounted within a bore 82 of a usual metal hub 83. A shaft is adapted to be telescopically received within a cylindrical opening 84 formed by inner race 85 of bearing assembly 81 for rotatably mounting pulley 80 on the shaft.

An annular metal body, indicated generally at 86, is mounted on hub 83 for rotation with the hub. Body 86 includes an annular web 87 which terminates at one end in a cylindrical axially extending annular flange 88 which telescopically mounts body 86 on hub 83. Web 87 terminates at the other end in an axially extending cylindrical wall 89. In accordance with the invention, a multi-V-groove pulley formation, indicated generally at 90, is molded of plastic on the outer surface of cylindrical wall 89. Formation 90 is the same as the previously described plastic multi-V-groove pulley formations.

Sixth Embodiment

A sixth embodiment of the improved composite plastic pulley is indicated generally at 93, and is shown in FIG. 15. The metal and hub portion of embodiment 93 is similar to the third embodiment 55 shown in FIG. 7 except that the additional metal pulley portion 57 is eliminated from the sixth embodiment and the metal portion is connected by welding or brazing directly to hub 56.

Again, in accordance with the invention, a multi-V-groove pulley formation, indicated generally at 94, is molded of plastic on the outer surface of cylindrical wall 95. Formation 94 is similar to the plastic formations previously described with respect to the first five embodiments except that the belt-retaining annular flanges 96 and 97 do not extend radially outwardly beyond crests 98 of the series of V-shaped grooves 99 provided therein as do belt-retaining flanges 11 and 12. Retaining flanges 96 and 97 terminate radially below crest 98 and preferably have a thickened configuration to provide strength and rigidity to plastic formation 94.

SUMMARY

The various embodiments of the improved composite pulley, indicated generally at 1, 33, 55, 70, 80 and 93, provide a construction which has the advantages of an all-metal pulley as well as the advantages of a plastic pulley. The main body portion of the pulley can be stamped inexpensively or roller spun by usual procedures to form a cup-shaped body of any desired shape and configuration from sheet metal. Various hub mounting means can be incorporated with the metal body whereby the pulley can be adapted for use in different applications for which vehicle accessory drive pulleys are required.

The pulley grooves are formed by the plastic formation securely bonded on an outer cylindrical wall of the pulley, which wall is free of outwardly projecting tabs or the like. That is, the interface between the bonded inner cylindrical surface of the solid plastic body and the outer cylindrical surface of the metal body is uninterrupted by the projection into plastic body recesses of metal body tabs, offset wall portions and the like for joining the metal and plastic bodies. The plastic material provides better belt life and pulley groove tolerances than possible with the all-metal pulley. This composite pulley construction uses less plastic than prior composite plastic metal pulleys or all-plastic pulleys without sacrificing strength due to the particular V-groove formation thereof, and it enables thinner parent metals to be used for the cup body than in prior all-metal pulleys since additional metal is not required in an outer portion for forming the grooves. This results in both a lighter weight and less expensive pulley than prior all-metal pulleys.

As indicated in the various embodiments and below in describing the entrapped generally cylindrical axially extending metal body mounting wall, the cylindrical metal wall has a circular edge at one end and an annular shoulder at the other end with which the radially inwardly extending annular flange at one end of the plastic body inner cylindrical surface and an annular inturned shoulder at the other end of said inner cylindrical surface of the plastic body, respectively, are engaged when the plastic body is molded. This entrapping engagement supports and bonds the plastic body on and to the metal body with the addition of only interface bonding engagement between the outer generally cylindrical surface of the metal body and the inner generally cylindrical surface of the plastic body.

The particular pulley configurations and hub mounting means shown in the drawings and described above merely illustrate various configurations and the invention, and the invention need not be limited to the particular six embodiments shown. The metal cup-shaped body on which the plastic V-groove formation is mounted can have other configurations. The unique plastic V-groove formation of the invention in combination with the metal body, entraps the generally cylindrical, axially extending mounting wall of the metal body between the inner end portions of the spaced pair of belt-retaining members, securing it on the metal body without any reinforcing projecting components. This entrapment, in combination with the natural contraction of the plastic material upon cooling and knurled surface on the axial mounting wall, firmly attaches the V-groove formation on the mounting wall preventing any axial or rotational movement of the formation with respect to the metal cup body. Furthermore, the particular inverted V-shaped projections which form the intervening V-grooves in combination with the belt-retaining end flanges provide for a smooth-running engagement with a serpentine drive belt which generates less heat than the prior pulley V-grooves which are engaged with the trapezoidal-shaped drive belts.

FIGS. 13 and 14 show in an enlarged state the details of the configuration of the plastic V-groove formation mounted on the axially extending cylindrical wall portion of the metal body, and the knurling 30 which preferably extends through the length of the mounting wall. Knurling 30 preferably is provided on the outer surfaces of the axially extending wall portions of all of the embodiments on which the plastic V-groove formation is molded to assist the bonding therebetween.

Accordingly, the composite pulley construction is simplied, provides an effective, safe, inexpensive and efficient pulley which achieves all the enumerated objectives, provides for eliminating difficulties encountered with prior pulleys, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the composite plastic pulley is constructed and used, the characteristics of the construction, and the advantageous, new and useful results obtained, the new and useful structures, devices, elements, arrangements, parts, and combinations, are set forth in the appended claims.

I claim:

1. In a composite plastic pulley of the type having belt-engaging grooves, in which the pulley has a metal body and a molded plastic annular grooved body supported on the metal body, in which the metal body has hub means concentric about a central axis passing through the center of said hub means for mounting the pulley for rotation, in which said metal body has a cylindrical wall concentric about said axis and connected with said hub means, and in which said molded plastic body is attached to said wall; wherein the improvement comprises:

(a) the metal body cylindrical wall having a circular edge at one end and an annular shoulder at the other end of said cylindrical wall, said shoulder being connected completely circumferentially with said hub means;

(b) said cylindrical wall having an uninterrupted outer generally cylindrical surface extending between said circular end and said annular shoulder;

(c) said molded plastic annular body being solid throughout and having an uninterrupted inner generally cylindrical surface complementary to said metal wall cylindrical outer surface;

(d) said annular plastic body having a radially inwardly extending annular flange at one end of the plastic body inner cylindrical surface and having an annular inturned shoulder at the other end of said inner cylindrical surface complementary to said metal body annular shoulder;

(e) the inturned flange and inturned shoulder of said plastic body as molded, respectively, engaging the circular edge and annular shoulder of said metal body cylindrical wall to support and bond the plastic body on and to the metal body with interface engagement between the outer generally cylindrical surface of the metal body and the inner generally cylindrical surface of the plastic body;

(f) the outer annular portion of said molded plastic solid body aving poly-V-grooves formed therein surrounding the plastic body inner cylindrical surface and the metal body cylindrical wall, said poly-V-grooves being defined by a series of outwardly opening v-shaped grooves located between a pair of spaced belt retaining annular flanges with said flanges extending radially outwardly beyond crests of said V-shaped grooves; and (g) said plastic body being molded from high temperature, reinforced lastic of one of the class consisting of thermoplastics and thermosetting plastics.

* * * * *

UNITED STATES PATENT AND TRADEMARK OFFICE
CERTIFICATE OF CORRECTION

PATENT NO. : 4,468,210
DATED : August 28, 1984
INVENTOR(S) : Ben O. McCutchan, Jr.

It is certified that error appears in the above—identified patent and that said Letters Patent are hereby corrected as shown below:

Column 5, line 62, the numeral "4" should be - 44 - ;

Column 10, line 25, "aving" should be corrected to read -having-

Column 10, lin3 34, "lastic" should be corrected to read - plastic - .

Signed and Sealed this

Eighth Day of January 1985

[SEAL]

Attest:

Attesting Officer

GERALD J. MOSSINGHOFF

Commissioner of Patents and Trademarks